US012633776B2

(12) United States Patent　　　　(10) Patent No.:　US 12,633,776 B2
Chu et al.　　　　　　　　　　　　　(45) Date of Patent:　　May 19, 2026

(54) METHOD AND DEVICE FOR CONTROLLING AMOUNT OF POWER SUPPLIED TO LOAD IN DEVICE USING WIRELESS POWER TRANSMISSION

(71) Applicant: SAMSUNG ELECTRONICS CO., LTD., Suwon-si (KR)

(72) Inventors: Jungsuk Chu, Suwon-si (KR); Taeho Lee, Suwon-si (KR); Dongoh Kang, Suwon-si (KR); Kanghoon Kim, Suwon-si (KR); Yongwook Kim, Suwon-si (KR); Namju Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/438,761

(22) Filed: Feb. 12, 2024

(65) Prior Publication Data

US 2024/0186828 A1　　Jun. 6, 2024

Related U.S. Application Data

(63) Continuation of application No. PCT/KR2022/012109, filed on Aug. 12, 2022.

(30) Foreign Application Priority Data

Aug. 12, 2021　(KR) ......................... 10-2021-0106941

(51) Int. Cl.
　*H02J 50/12*　　(2016.01)
　*H02M 1/00*　　(2007.01)
(52) U.S. Cl.
　CPC ........... *H02J 50/12* (2016.02); *H02M 1/0009* (2021.05); *H02M 1/0058* (2021.05); *H02J 2310/14* (2020.01)

(58) Field of Classification Search
　CPC ......... H02J 50/10; H02J 50/12; H02J 2310/14
　See application file for complete search history.

(56) References Cited

U.S. PATENT DOCUMENTS 9,203,475　B2　12/2015　Kim et al.
9,219,378　B2　12/2015　Mudrick et al.
(Continued)

FOREIGN PATENT DOCUMENTS

KR　　20130135260　A　　12/2013
KR　　20140060180　A　　5/2014
(Continued)

OTHER PUBLICATIONS

ON Semiconductor, "Induction Cooking: Everything You Need to Know," AND9166/D, Oct. 2014, 22pages.
(Continued)

*Primary Examiner* — Daniel Cavallari
*Assistant Examiner* — Joseph N Inge

(57) ABSTRACT

A wireless power-driven household device for controlling an amount of power to be supplied to a load includes a wireless power transmitter configured to wirelessly transmit power via a transmitting coil, a receiving coil configured to wirelessly receive power from the transmitting coil of the wireless power transmitter, a rectifier configured to rectify an alternating current (AC) voltage received wirelessly, a direct current (DC) link configured to receive a DC voltage that is an output of the rectifier, a current sensor configured to sense current supplied from the DC link to the load, a switch provided between the rectifier and the DC link to adjust an amount of power to be supplied to the load based (Continued)

on the current supplied to the load and sensed by the current sensor, and a controller configured to control an on/off state of the switch.

20 Claims, 11 Drawing Sheets

(56)                   References Cited

U.S. PATENT DOCUMENTS

| | | | |
|---|---|---|---|
| 9,391,535 | B2 | 7/2016 | Yeo et al. |
| 9,531,444 | B2 | 12/2016 | Bae |
| 11,876,383 | B1 * | 1/2024 | Safaee .................... H02J 50/12 |
| 2012/0104867 | A1 | 5/2012 | Mudrick et al. |
| 2013/0099588 | A1 * | 4/2013 | Yeo ......................... H02J 50/10 |
| | | | 307/104 |
| 2015/0239354 | A1 * | 8/2015 | Gorai ...................... B60L 53/38 |
| | | | 307/10.1 |
| 2015/0295450 | A1 | 10/2015 | Bae |
| 2017/0018973 | A1 * | 1/2017 | Murayama .......... H02J 7/00712 |
| 2017/0104373 | A1 | 4/2017 | Bae |
| 2017/0187245 | A1 | 6/2017 | Uchida |
| 2018/0254667 | A1 * | 9/2018 | Okazaki .................. H02J 50/60 |
| 2019/0288559 | A1 | 9/2019 | Kato |
| 2020/0014216 | A1 | 1/2020 | Hwang et al. |
| 2020/0106290 | A1 | 4/2020 | Ma |
| 2020/0280211 | A1 | 9/2020 | Bae |
| 2020/0287421 | A1 | 9/2020 | Egenter et al. |
| 2021/0305844 | A1 | 9/2021 | Choi et al. |

FOREIGN PATENT DOCUMENTS

| | | | |
|---|---|---|---|
| KR | 20140130083 | A | 11/2014 |
| KR | 101543059 | B1 | 8/2015 |
| KR | 20170044177 | A | 4/2017 |
| KR | 101818591 | B1 | 1/2018 |
| KR | 101835125 | B1 | 3/2018 |
| KR | 101880781 | B1 | 7/2018 |
| KR | 20180104536 | A | 9/2018 |
| KR | 101896944 | B1 | 10/2018 |
| KR | 101979459 | B1 | 5/2019 |
| KR | 20200007519 | A | 1/2020 |
| KR | 20200014065 | A | 2/2020 |
| KR | 20200015007 | A | 2/2020 |
| KR | 20210135707 | A | 11/2021 |

OTHER PUBLICATIONS

International Search Report and Written Opinion of the International Searching Authority dated Nov. 14, 2022, in connection with International Application No. PCT/KR2022/012109, 16 pages.
Office Action dated Feb. 21, 2026, in connection with Korean Application No. 10-2021-0106941, 13 pages.

* cited by examiner

FIG. 5

FIG. 8
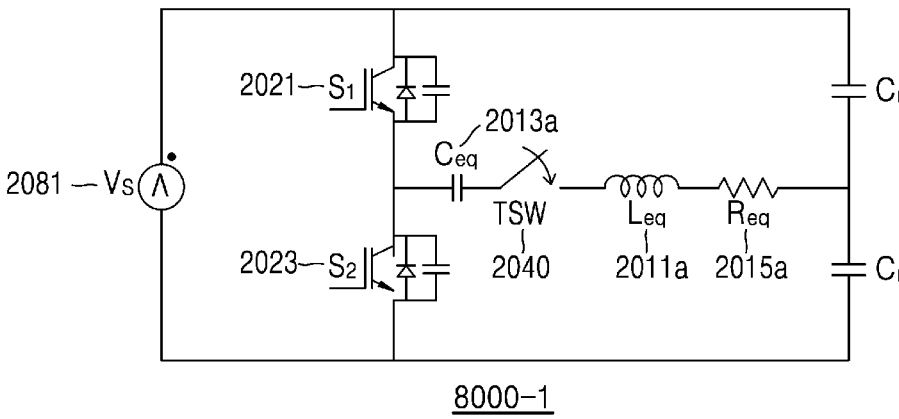
8000-1
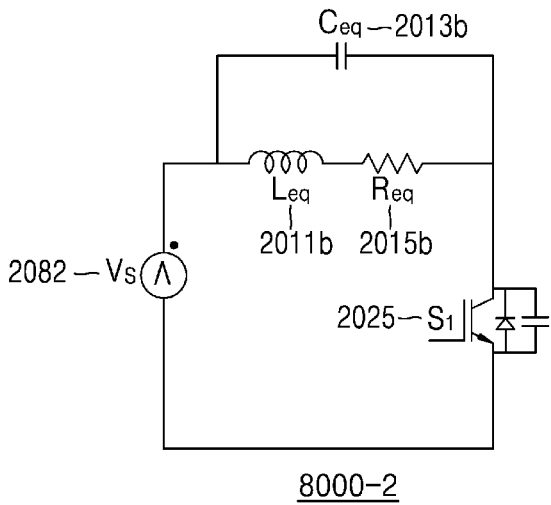
8000-2

FIG. 9

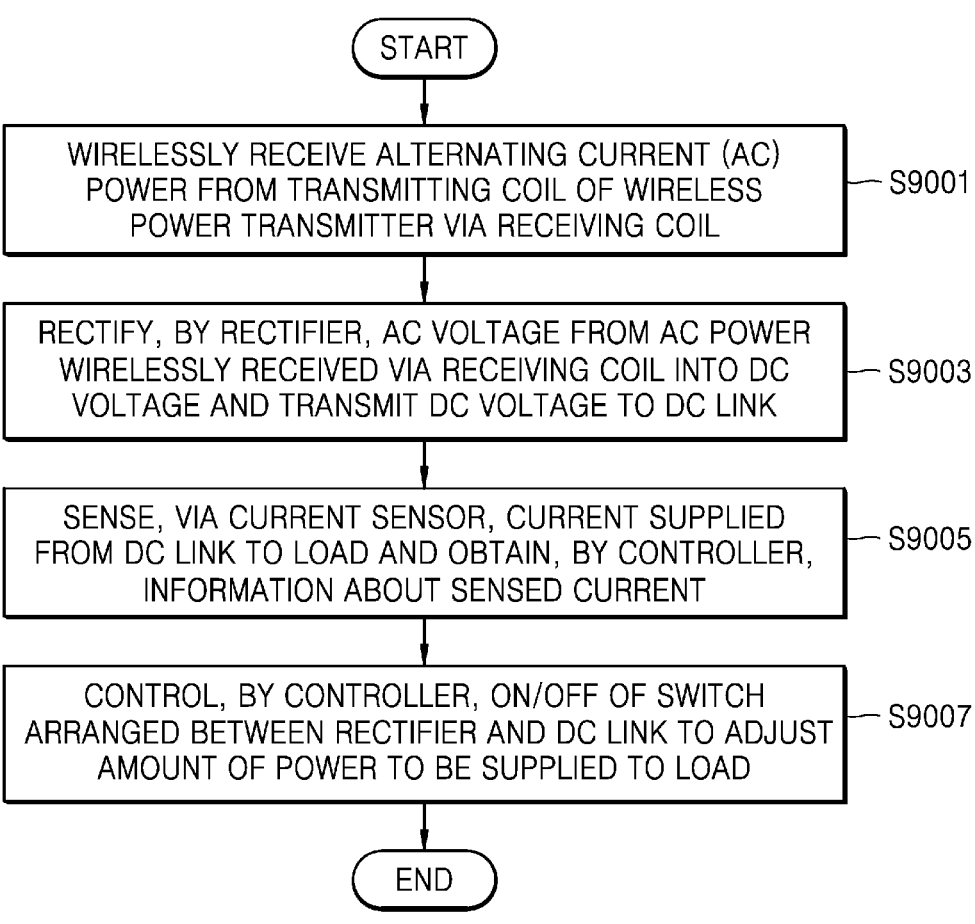

START

WIRELESSLY RECEIVE ALTERNATING CURRENT (AC) POWER FROM TRANSMITTING COIL OF WIRELESS POWER TRANSMITTER VIA RECEIVING COIL — S9001

RECTIFY, BY RECTIFIER, AC VOLTAGE FROM AC POWER WIRELESSLY RECEIVED VIA RECEIVING COIL INTO DC VOLTAGE AND TRANSMIT DC VOLTAGE TO DC LINK — S9003

SENSE, VIA CURRENT SENSOR, CURRENT SUPPLIED FROM DC LINK TO LOAD AND OBTAIN, BY CONTROLLER, INFORMATION ABOUT SENSED CURRENT — S9005

CONTROL, BY CONTROLLER, ON/OFF OF SWITCH ARRANGED BETWEEN RECTIFIER AND DC LINK TO ADJUST AMOUNT OF POWER TO BE SUPPLIED TO LOAD — S9007

END

METHOD AND DEVICE FOR CONTROLLING AMOUNT OF POWER SUPPLIED TO LOAD IN DEVICE USING WIRELESS POWER TRANSMISSION

CROSS-REFERENCE TO RELATED APPLICATIONS

This application is a bypass continuation of International Application No. PCT/KR2022/012109, filed Aug. 12, 2022, which claims priority to Korean Patent Application No. 10-2021-0106941 filed Aug. 12, 2021, the disclosures of which are herein incorporated by reference in their entirety.

BACKGROUND

1. Field

Embodiments of the disclosure relate to a method and apparatus for controlling power supplied to a load in a device using wireless power transmission.

2. Description of Related Art

Wireless Power Transfer (WPT) refers to a technology for supplying power wirelessly to household appliances or electric vehicles by removing power lines.

With the advancement of technology for freely supplying required power wirelessly wherever a device requiring the power is located, a paradigm for power supply and power lines is dramatically changing not only in household appliance applications but also in IT technology.

Developers have developed WPT technologies in various frequency bands, but most of them have difficulties in commercialization except for a non-contact inductive coupling technique using a low frequency of several hundred kilohertz (kHz). Because the non-contact inductive coupling technique using a relatively low frequency enables the use of low-cost switching-type power converters and thus provides excellent power transmission efficiency, this technique have been used in commercial applications such as cordless electric razors, electric toothbrushes, etc., and have recently been applied to mobile IT devices such as mobile phones.

A WPT method exploiting the non-contact inductive coupling technique is a method of wirelessly transmitting/receiving power by linking a transmitting coil (magnetic resonator) on a transmitter side having a power source with a receiving coil on a receiver side.

In this case, because the receiving coil on the receiver side is connected to a load, and the amount of power required by the load varies according to circumstances, a switch is needed to adjust the amount of power supplied to the load, and a controller such as a processor controls the switch. Furthermore, when a wireless power-driven household device (home appliance) uses a constant voltage control method, the manufacturer needs to increase a capacitance of a direct current (DC) link capacitor to cope with a maximum load by taking into account load variation.

Furthermore, when the wireless power-driven household device measures only a DC-link voltage to control the amount of power to be supplied to the load, it is difficult to respond to variations in loads having various specifications when a load is simply of a voltage-controllable type. In addition, when a plurality of loads are connected in parallel to one another, it is difficult for the wireless power-driven household device to independently control the amount of power required by each of the loads.

SUMMARY

Provided are a wireless power-driven household device and method capable of controlling the amount of power while minimizing a switching loss by sensing, by a device (wireless power receiving device) using wireless power transfer (WPT), current supplied to a load and thereby determining the amount of power supplied to the load.

Also provided are a switch arrangement method and a wireless power-driven household device that includes a switch arrangement, capable of independently controlling each of a plurality of loads in a device using WPT when the plurality of loads are connected to the wireless power-driven household device.

According to an embodiment of the disclosure, a wireless power receiving device includes a receiving coil configured to wirelessly receive power from a wireless power transmitting device, a rectifier configured to rectify an alternating current (AC) voltage received wirelessly into a direct current (DC) voltage and output the DC voltage, a first DC link configured to receive the DC voltage output from the rectifier, a current sensor configured to sense current supplied from the first DC link to a first load, a first switch provided between the rectifier and the first DC link, and a controller configured to adjust an amount of power to be supplied to the first load by controlling on/off of the first switch based on the current supplied to the first load and sensed by the current sensor.

According to another embodiment of the disclosure, a wireless power-driven household device includes a wireless power transmitter configured to wirelessly transmit power via a transmitting coil, a receiving coil configured to wirelessly receive power from the transmitting coil of the wireless power transmitter, a rectifier configured to rectify an AC voltage received wirelessly into a DC voltage and output the DC voltage, a first DC link configured to receive the DC voltage output from the rectifier, a current sensor configured to sense current supplied from the first DC link to a first load, a first switch provided between the rectifier and the first DC link, and a controller configured to adjust the amount of power to be supplied to the first load by controlling on/off of the first switch based on the current supplied to the first load and sensed by the current sensor.

According to another embodiment of the disclosure, a method, performed by a wireless power-driven household device, of controlling an amount of power to be supplied to a load includes wirelessly receiving power from a transmitting coil of a wireless power transmitter, rectifying, by a rectifier, an AC voltage received wirelessly and transmitting a rectified voltage to a first DC link, sensing, by a current sensor, current supplied from the first DC link to a first load, and adjusting, by a controller, the amount of power to be supplied to the first load by controlling on/off of a first switch provided between the rectifier and the first DC link.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a wireless power-driven household device including a transmitter switch according to an embodiment of the disclosure;

FIG. 8 illustrates circuit diagram of a wireless power transmitting device according to an embodiment of the disclosure;

FIG. 9 illustrates flowchart of a method of controlling the amount of power supplied to a load in wireless power-driven household device, according to an embodiment of the disclosure.

DETAILED DESCRIPTION

Figure 1A:
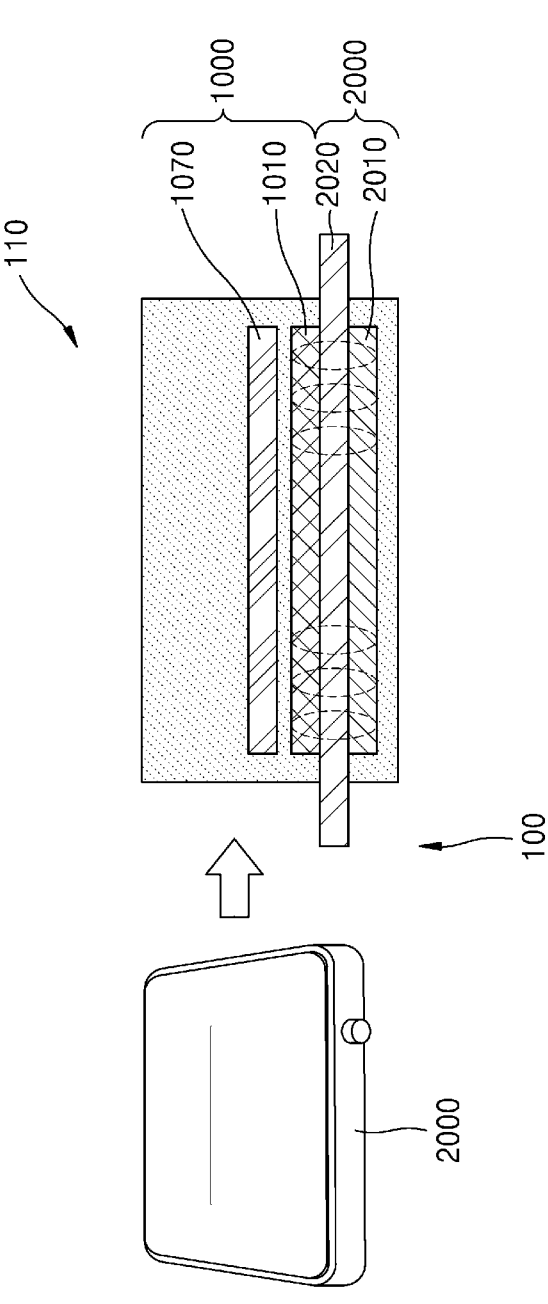
FIG. 1A illustrates a system driven by wireless power (hereinafter, referred to as a 'wireless power-driven system'), according to an embodiment of the disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Terms used in the present specification will now be briefly described and then the disclosure will be described in detail.

The terms used in the disclosure are general terms currently widely used in the art based on functions described in the disclosure, but may be changed according to an intention of one of ordinary skill in the art, precedent cases, advent of new technologies, etc. Furthermore, some particular terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the disclosure, the expression "at least one of a, b or c" indicates only a, only b, only c, both a and b, both a and c, both b and c, all of a, b, and c, or variations thereof.

Throughout the specification, when a part "includes" or "comprises" an element, unless there is a particular description contrary thereto, it is understood that the part may further include other elements, not excluding the other elements. Furthermore, terms such as "portion," "module," etc. used herein indicate a unit for processing at least one function or operation and may be embodied as hardware or software or a combination of hardware and software.

Throughout the disclosure, the terms 'household appliance' and 'household device' having the same meaning may be used interchangeably with each other.

Embodiments of the disclosure will now be described more fully hereinafter with reference to the accompanying drawings so that they may be easily implemented by one of ordinary skill in the art. However, the disclosure may be implemented in different forms and should not be construed as being limited to the embodiments set forth herein. In addition, parts not related to descriptions of the disclosure are omitted to clearly explain embodiments of the disclosure in the drawings, and like reference numerals denote like elements throughout.

FIG. 1A illustrates a system 100 driven by wireless power, according to an embodiment of the disclosure.

As shown in FIG. 1A, household appliance 1000 of the system 100 driven by the wireless power refers to all types of receiving coil type household appliance driven by wireless power. Examples of the household appliance 1000 according to the disclosure include all types of household appliances, including household appliance for 'heating' such as induction cooking appliance, an electric range, a kettle (electric kettle), a toaster, a coffee machine, a steamer, an electric rice cooker, a waffle maker, and an electric oven, motorized equipment powered by a wireless supply of 'electricity', such as a blender, a juicer, a noodle maker, and a kneader, and other equipment powered by a wireless supply of 'electricity', such as a wireless battery charger, a cordless lamp, etc.

Being 'driven by wireless power' means heating the household appliance 1000 or driving a load by receiving power via a magnetic field induced in a receiving coil or metal (e.g., an iron component) of the household appliance 1000 by using a magnetic induction method. For example, a wireless power transmitting device 2000 of FIG. 1 may allow a current to flow in a wireless power transmitter 2010 including a transmitting coil to create a magnetic field that is then induced in a wireless power receiver 1010 of the household appliance 1000. In this way, electrical output (e.g., driving a motor or charging a battery) or heating (heating) is performed through the magnetic field induced in the wireless power receiver 1010.

FIG. 1A shows an example in which the household appliance 1000 is induction cooking appliance using electromagnetic induction. However, the household appliance 1000 driven by wireless power according to the disclosure is not limited to the induction cooking appliance. The household appliance 1000 may be inductively heated by the wireless power transmitting device 2000, and may be various types of containers having magnetism capable of communicating with the wireless power transmitting device 2000. When the household appliance 1000 driven by wireless power is heating and cooking appliance, contents therein may be liquids such as water, tea, coffee, soup, juice, wine, etc., or solids such as butter and meat, but are not limited thereto.

According to an embodiment of the disclosure, the household appliance 1000 may be a receiving coil type household appliance. In this case, the household appliance 1000 may include a wireless power receiver 1010 including a receiving coil for driving a load.

When an alternating current (AC) is supplied to the wireless power transmitter 2010 of the wireless power transmitting device 2000, a time-varying magnetic field is induced in a transmitting coil included in the wireless power transmitter 2010. The magnetic field generated by the transmitting coil passes through a bottom surface of the household appliance 1000. When a time-varying magnetic field passes through a receiving coil magnetic field passes through the receiving coil included in the wireless power receiver 1010 of the household appliance 1000, a current is induced in the receiving coil by the time-varying magnetic field, which is called an electromagnetic induction phenomenon.

When the household appliance 1000 is a receiving coil type household appliance, the load may be an electrical load capable of operating the household appliance 1000, such as a heater or a motor. An example of the load of the household appliance 1000 may be a heater, a motor, or a battery to be charged. The wireless power receiver 1010 may supply power to all components that are operable by receiving power, in addition to heating a heater or driving a motor as a load.

According to an embodiment of the disclosure, the heater is for heating ingredients in the household appliance 1000. The heater may have various shapes, and an outer shell of the heater may be formed of various materials (e.g., iron, stainless, copper, aluminum, incoloy, inconel, etc.).

The receiving coil of the household appliance 1000 may wirelessly receive power from the transmitting coil included in the wireless power transmitter 2010 of the wireless power transmitting device 2000 through magnetic induction. The magnetic induction is a method of transferring energy by applying a magnetic field created by a current flowing in the transmitting coil to the receiving coil.

110 of FIG. 1A shows a cross-section of the household appliance 1000 driven by wireless power and the wireless power transmitting device 2000. Referring to 110 of FIG. 1, the wireless power transmitting device 2000 includes the wireless power transmitter 2010 including a transmitting coil for wirelessly transmitting power by receiving utility power via a wire.

The household appliance 1000 includes a wireless power receiver 1010 including a receiving coil for wirelessly receiving power from the transmitting coil of the wireless power transmitting device 2000. When the household appliance 1000 is cooking appliance for heating, the household appliance 1000 includes a heating plate as a load 1070 provided above the wireless power receiver 1010 and heated by the receiving coil. Although FIG. 1 shows that the load 1070 that is the heating plate consists of a heater as a whole or part thereof, the load 70 is not limited thereto, and according to an embodiment of the disclosure, may be a motor, a battery, etc., to which power is supplied by a receiving coil.

The wireless power transmitting device 2000 includes a top plate such as glass 2020 on the wireless power transmitter 2010. The glass 2020 of the wireless power transmitting device 2000 may be formed of tempered glass such as ceramic glass so that the top plate of the wireless power transmitting device 2000 is not easily broken.

Because there is no wired connection between the wireless power transmitting device 2000 and the household appliance 1000 including the receiving coil and the load 1070 that is the heating plate, the household appliance 1000 may be freely separated as cord-free from the wireless power transmitting device 2000 including the wireless power transmitter 2010.

According to an embodiment of the disclosure, the household appliance 1000 may be an integrated type equipment including the wireless power transmitting device 2000 or even the wireless power transmitter 2010. For example, the wireless power transmitting device 2000 including the wireless power transmitter 2010 and the household appliance 1000 may be handled and sold separately, and the household appliance 1000 and the wireless power transmitting device 2000 may be respectively treated as separate products. Throughout this specification, the wireless power transmitting device 2000 and the wireless power transmitter 2010 may be integrated into and handled as a single wireless power-driven household appliance or household appliance. For example, when the wireless power transmitting device 2000 and the household appliance 1000 are integrated into a single device, the single device may be referred to as wireless power-driven household appliance or wireless power-driven household appliance.

Figure 1B:
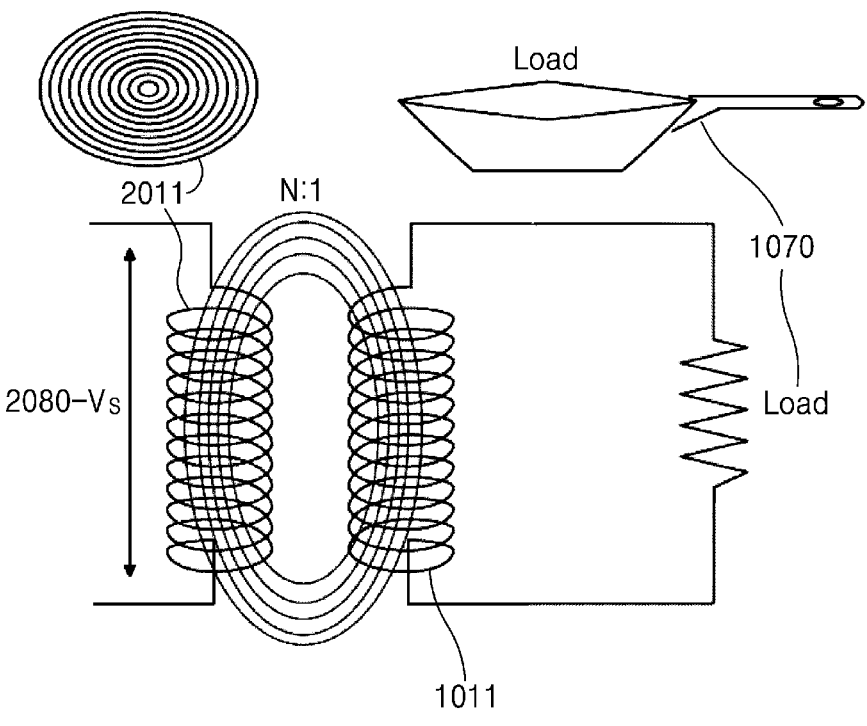
FIG. 1B illustrates a wireless power-driven system according to an embodiment of the disclosure.

FIG. 1B illustrates a wireless power-driven system according to an embodiment of the disclosure.

FIG. 1B shows an example in which a transmitting coil 2011 and a receiving coil 1011 share a magnetic flux to wirelessly transfer power. An AC voltage 2080 obtained by converting utility power to several kHz to several tens of kHz is applied to the transmitting coil 2011, and the receiving coil 1011 receives power wirelessly by sharing the magnetic flux with the transmitting coil 2011 and supplies the received power to a load 1070.

Figure 2:
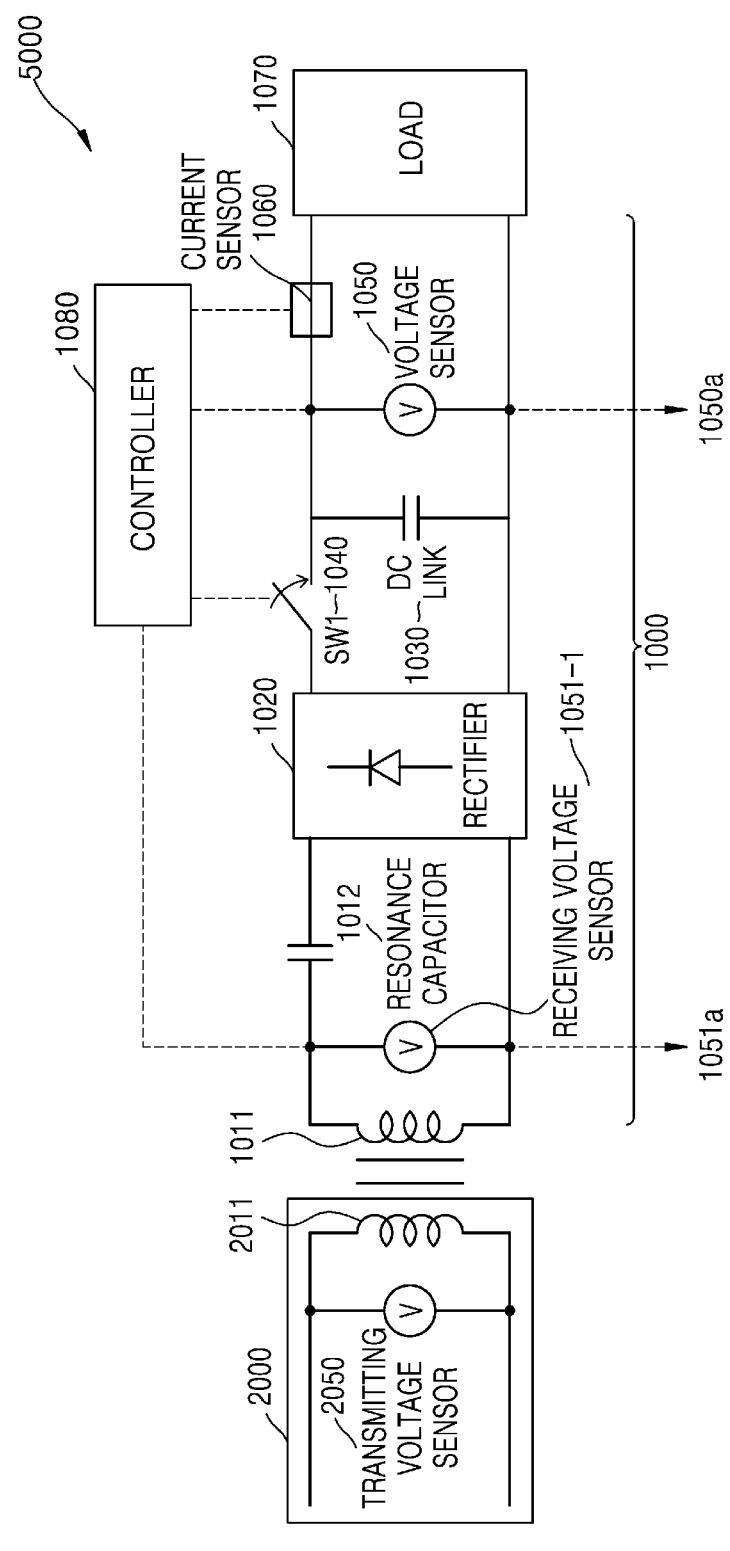
FIG. 2 illustrates household appliance for controlling the amount of power supplied to a load, according to an embodiment of the disclosure.

FIG. 2 illustrates household appliance 1000 for controlling the amount of power supplied to a load 1070, according to an embodiment of the disclosure.

Referring to FIG. 2, the household appliance 1000 includes a receiving coil 1011 for receiving wireless power from a transmitting coil 2011 of the wireless power transmitting device 2000, a resonance capacitor 1012 for resonating with the receiving coil 1011, and a rectifier 1020 for rectifying the AC voltage generated by resonance to a direct current (DC) voltage.

Furthermore, the household appliance 1000 may include a receiving voltage sensor 1050-1 for sensing a voltage generated due to resonance between the receiving coil 1011 and the resonance capacitor 1012. A DC voltage output from the rectifier 1020 is established at a DC link 1030. The DC link 1030 is composed of DC-link capacitors. In general, a DC-link capacitor in the DC link 1030 is used to smooth a DC voltage according to a size of a load 1070 that requires a constant voltage, and is configured as a capacitor having a large capacitance in proportion to the size of the load 1070. However, a controller 1080 of the household appliance 1000 according to the disclosure is able to control on/off of a switch 1040 connected to the receiving coil 1011 for receiving power to actively respond to the amount of power (the average amount of power) required by the load 1070, and thus, the DC link capacitor according to the disclosure may have a relatively small capacitance. According to an embodiment of the disclosure, when a wireless power-driven household device 5000 is capable of producing a power output of about 30 watts (W) to about 2 kilowatts (KW) and maximally uses the received AC power instead of a constant voltage, the DC link capacitor may have a capacitance less than tens of microfarads (μF).

A current sensor 1060 senses a current supplied from the DC link 1030 to the load 1070. The controller 1080 obtains information about the current sensed by the current sensor 1060 and information about a voltage via a voltage sensor 1050 that senses the voltage of the DC link 1030. The controller 1080 determines the amount of power required by the load 1070 based on the information about the collected current and the information about the voltage. According to an embodiment of the disclosure, in a case where the household appliance 1000 is a heating device, and a power (heating) output level may be discretely raised from level 1 to level 3, when a user lowers the power output level from level 3 to level 2, the controller 1080 may determine the amount of power required by the load 1070 based on a change in current flowing through the load 1070. For example, in a case where a root mean square (rms) average value of the DC link 1030 is 200V, and the magnitude of an average power sensed by the current sensor 1060 and the voltage sensor 1050 for each output level is 200 W at level 1, 600 W at level 2, and 1 kW at level 3, when the user lowers the power (heating) output level from level 3 to level 2, power required by the load 1070 is reduced from 1 kW to 600 W. The controller 1080 may control the on/off of the switch 1040 based on the drop from 1 kW of power required at level 3 to 600 W of power required at level 2 to reduce an average voltage (average power) at a DC link terminal. According to an embodiment of the disclosure, the output level of the household appliance 1000 may be changed not only in a discrete manner as described above but also in a continuous manner according to a design of the household appliance 1000.

The controller 1080 may be at least one processor or a printed circuit board (PCB) control board including the at least one processor.

The processor controls all operations of the household appliance 1000 driven by wireless power according to an embodiment of the disclosure. For example, the processor may control the operations of the household appliance 1000 including the switch 1040 by executing programs stored in a memory. According to an embodiment of the disclosure, the controller 1080 may control the wireless power transmitting device 2000 as well when the household appliance 1000 and the wireless power transmitting device 2000 are both treated as a single product. According to another embodiment of the disclosure, the controller 1080 controls (for example, only controls) the household appliance 1000, and the wireless power transmitting device 2000 may include a separate transmitter-side controller (not shown). In this case, the controller 1080 and the transmitter-side controller may transmit/receive data through short-range communication.

According to an embodiment of the disclosure, the processor may include, but is not limited to, an artificial intelligence (AI) processor for generating a learning network model. According to an embodiment of the disclosure, the AI processor may be implemented as a chip separate from the processor and included in the controller 1080. According to an embodiment of the disclosure, the AI processor may be a general-purpose chip.

The receiving voltage sensor 1050-1 is used to sense an AC voltage generated when the receiving coil 1011 receives wireless power from the transmitting coil 2011 and resonates with the resonance capacitor 1012.

Although FIG. 2 shows for convenience that a side where the receiving coil 1011 is located is configured as the household appliance 1000, the household appliance 1000 and the wireless power transmitting device 2000 may be integrated into the wireless power-driven household device 5000.

The wireless power transmitting device 2000 may include a transmitting coil 2011 for wirelessly transmitting power and a transmitting voltage sensor 2050 for sensing a voltage generated by a resonance capacitor (not shown) resonating with the transmitting coil 2011.

Figure 3:
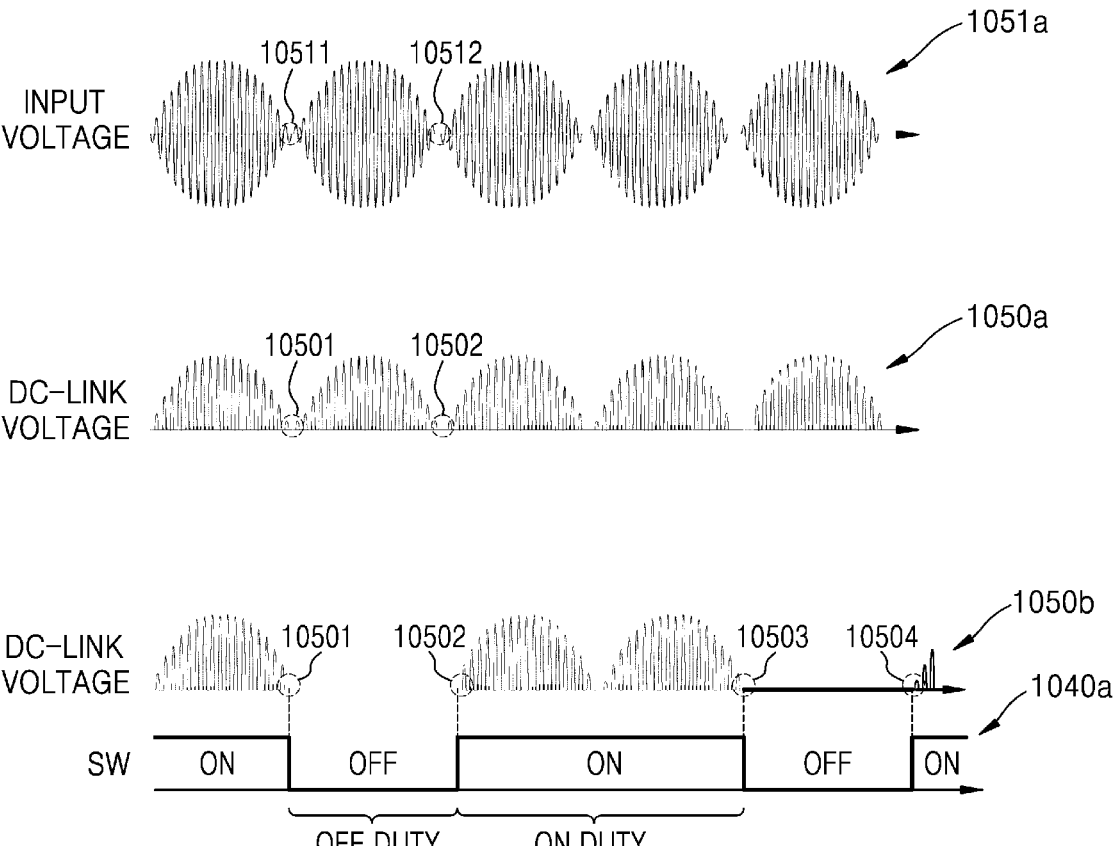
FIG. 3 illustrates soft switching synchronized with an input voltage, according to an embodiment of the disclosure.

FIG. 3 illustrates soft switching synchronized with an input voltage, according to an embodiment of the disclosure.

Referring to FIG. 3, waveform 1051a represents a waveform of an input AC voltage sensed by a receiving voltage sensor 1050-1 of FIG. 2, and waveform 1050a represents a waveform of a voltage across the DC link 1030 sensed by the voltage sensor 1050 of FIG. 2. Waveform 1050b represents a waveform of a voltage of the DC link 1030 sensed by the voltage sensor 1050 when the switch 1040 operates to control the amount of power required by the load 1070.

According to an embodiment of the disclosure, the controller 1080 may detect a zero-crossing point 10511 where an input AC voltage has a smallest amplitude and the waveform 1051a of the input AC voltage crosses a zero value while sensing the waveform 1051a via the receiving voltage sensor 1050-1.

According to an embodiment of the disclosure, the controller 1080 may detect a predefined voltage level of an amplitude of the input AC voltage while sensing the waveform 1051a of the input AC voltage via the receiving voltage sensor 1050-1.

In an embodiment of the disclosure, the voltage sensor 1050 for sensing a voltage of the DC link 1030 may sense a waveform 1050a of a DC voltage for the DC link 1030 to detect zero-crossing points 10501 and 10502 where an amplitude of the DC voltage has a smallest value and becomes zero (0). In another embodiment of the disclosure, the voltage sensor 1050 for sensing the voltage of the DC link 1030 may sense the waveform 1050*a* of the DC voltage for the DC link 1030 to detect a point where the DC voltage is at a preset voltage level.

In an embodiment of the disclosure, the controller 1080 may detect zero-crossing points 10511 and 10512 via the receiving voltage sensor 1050-1. To minimize a switching loss when opening and closing (on/off) the switch 1040 to control the amount of power supplied to the load 1070, the controller 1080 may synchronize the timing of on/off of the switch 1040 with the zero-crossing points 10511 and 10512 of the input AC voltage sensed by the receiving voltage sensor 1050-1. Waveform 1050*b* and on/off control signal 1040*a* show an example in which the controller 1080 synchronizes the timing of opening/closing (on/off) of the switch 1040 with the zero-crossing points 10511 and 10512 of the input AC voltage represented by the waveform 1051*a* in order to control the amount of power supplied by the controller 1080 to the load 1070.

In an embodiment of the disclosure, the controller 1080 may detect, via the receiving voltage sensor 1050-1, a point where a DC voltage for the DC link 1030 is at a preset voltage level, and determine the detected point as well as the zero-crossing points 10511 and 10512 as the timing of on/off of the switch 1040 in order to precisely control an average amount of power required by the load 1070 during on/off of the switch 1040. For example, the preset voltage level may be a point at which the DC voltage is at a voltage level corresponding to 10% or 20% of a maximum voltage for the DC link 1030.

Referring to FIG. 3, when turning off the switch 1040, as shown in 1051*a*, the controller 1080 performs soft switching by synchronizing the timing of on/off of the switch 1040 with the zero-crossing point 10511 where an amplitude of the input AC voltage has a smallest value, thereby minimizing a switching loss. Similarly, the controller 1080 turns on the switch 1040 at the zero-crossing point 10512 where the amplitude of the input AC voltage has a smallest value so that soft switching is performed even when the switch 1040 is turned on.

Referring to on/off control signal 1040*a* showing an operation of the switch 1040, the controller 1080 adjusts the amount of output power so that an OFF duty time of the switch 1040 is one half of an ON duty time. In this case, an output of a voltage 1050*b* of the DC link 1030 is repeatedly generated as output and no output at a ratio of 2:1. When less power is required by the load 1070, the ON duty time of the switch 1040 may be further reduced so that a ratio of the OFF duty time to ON duty time is 1:1. In this case, the controller 1080 controls the switch 1040 so that switching is soft switching as described above.

An ON-OFF duty cycle of the switch 1040 in on/off control signal 1040*a* may be equal to or a multiple of a cycle during which a magnitude of a voltage of the DC link 1030 is minimized. Alternatively, the ON-OFF duty cycle of the switch 1040 may be equal to or a multiple of a cycle during which the amplitude of the input AC voltage sensed by the receiving voltage sensor 1050-1 is equivalent to a smallest value.

Figure 4:
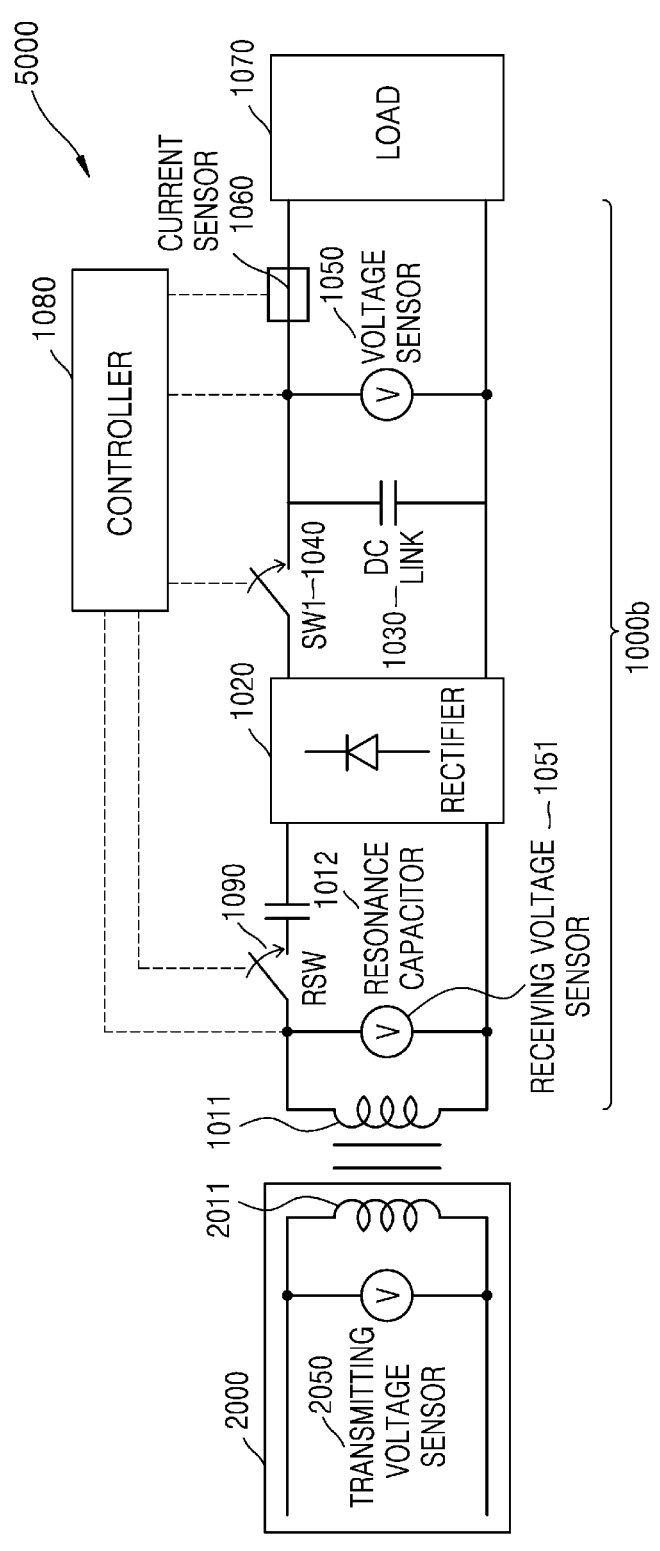
FIG. 4 illustrates a household appliance including a receiver switch, according to an embodiment of the disclosure.

FIG. 4 illustrates a household appliance 1000*b* including a receiver switch 1090, according to an embodiment of the disclosure.

Referring to FIG. 4, although all components of a wireless power transmitting device 2000 and the household appliance 1000*b* are substantially the same as their counterparts in FIG. 2 above, the household appliance 1000*b* further includes the receiver switch 1090 between a receiving coil 1011 and a resonance capacitor 1012.

According to an embodiment of the disclosure, a controller 1080 may control the amount of power supplied to a load 1070 by controlling the receiver switch 1090 in response to the amount of power required by the load 1070. In this case, on/off of the receiver switch 1090 is synchronized with a zero crossing point of a reception AC voltage sensed by a receiving voltage sensor 1050-1.

According to an embodiment of the disclosure, the controller 1080 may control the on/off of the receiver switch 1090 to be synchronized with a point where the reception AC voltage sensed by the receiving voltage sensor 1050-1 is at a preset voltage level so that a precise amount of power required by the load 1070 is supplied. For example, the point where the reception AC voltage is at the preset voltage level may be a point at which the reception AC voltage is at a voltage level corresponding to 10% or 20% of a maximum voltage, or the like.

According to an embodiment of the disclosure, the household appliance 1000*b* may include both or only one of the receiver switch 1090 and the switch 1040. The controller 1080 may independently control the receiver switch 1090 and the switch 1040 at different times, or otherwise, simultaneously control them in order to more quickly and adaptively respond to the amount of power required by the load 1070.

Figure 5:
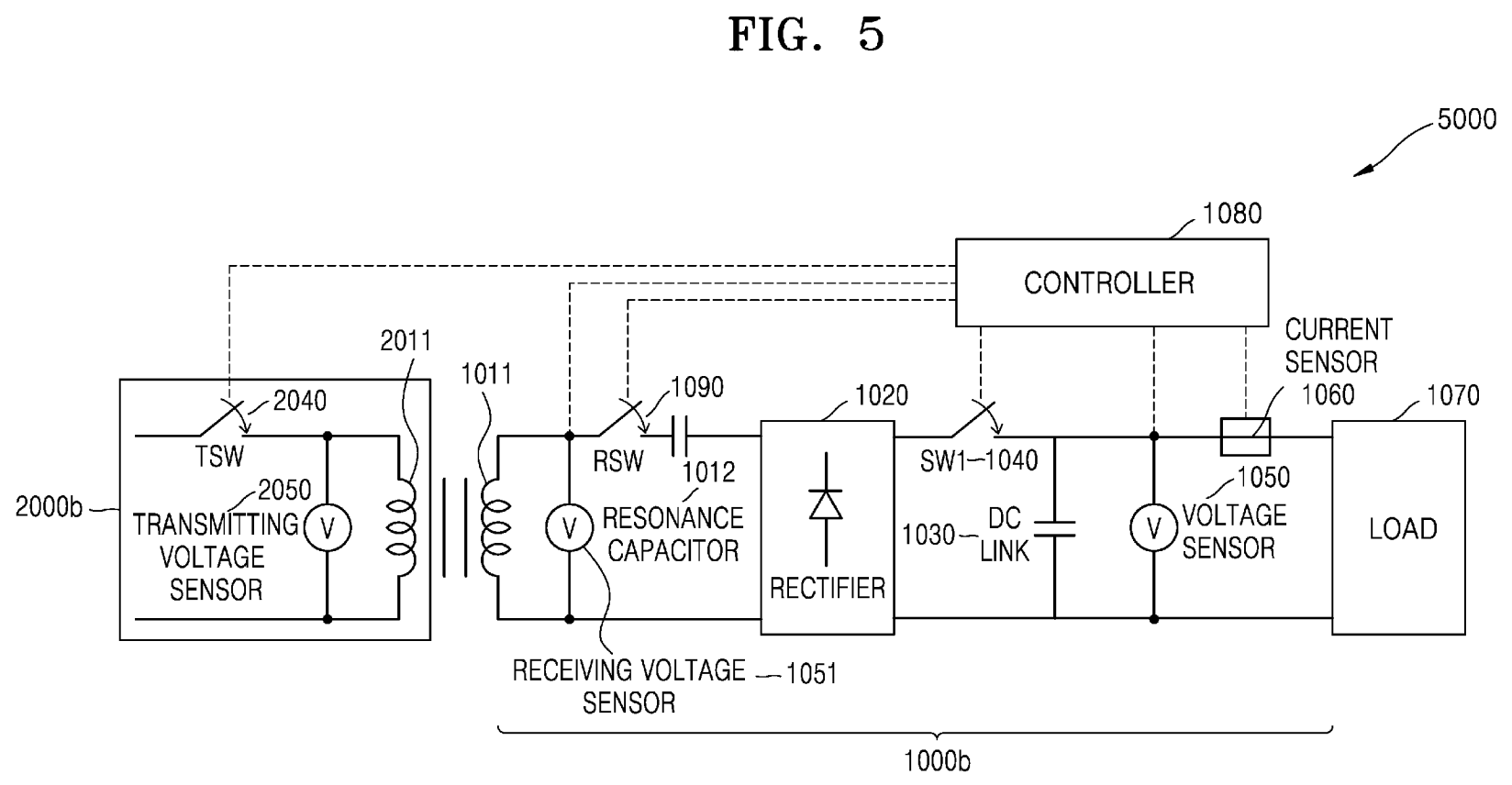

FIG. 5 illustrates a wireless power-driven household device including a transmitter switch 2040 according to an embodiment of the disclosure.

Referring to FIG. 5, although all components of a wireless power transmitting device 2000*b* and the household appliance 1000*b* are substantially the same as their counterparts in FIG. 4 above, the wireless power transmitting device 2000*b* further includes the transmitter switch 2040 connected in series to a transmitting coil 2011.

According to an embodiment of the disclosure, the controller 1080 may control the amount of power supplied to the load 1070 by controlling the transmitter switch 2040 in response to the amount of power required by the load 1070. In this case, on/off of the transmitter switch 2040 is synchronized with a zero crossing point of a transmission AC voltage sensed by a transmitting voltage sensor 2050.

According to an embodiment of the disclosure, the controller 1080 may control the transmitter switch 2040 to control the amount of power supplied to the load 1070 so that the on/off of the transmitter switch 2040 is synchronized with a preset level of the transmission AC voltage sensed by the receiving voltage sensor 1050-1 in addition to the zero-crossing point.

According to an embodiment of the disclosure, the wireless power transmitting device 2000*b* may be provided with the controller 1080 of the household appliance 1000*b* and a separate transmitter-side controller (not shown) so that the transmitter-side controller may control the transmitter switch 2040 in response to the amount of power required by the load 1070 independently of the controller 1080 to control the amount of power supplied to the load 1070.

According to an embodiment of the disclosure, the wireless power-driven household device 5000 may include both the transmitter switch 2040 and the switch 1040 or all of the transmitter switch 2040, the receiver switch 1090, and the switch 1040. The controller 1080 may independently control the transmitter switch 2040 and the switch 1040 at different times, or otherwise, simultaneously control them in order to more quickly and adaptively respond to the amount of power required by the load 1070.

According to an embodiment of the disclosure, when it is determined that it is difficult to quickly and actively control the amount of power to be supplied to the load 1070 according to the load's 1070 required amount of power only by controlling the switch 1040, the controller 1080 may further control additional switches, i.e., the receiver switch 1090 and/or the transmitter switch 2040. When controlling the transmit switch 2040, the controller 1080 may transmit the required amount of power to a controller (not shown) of the wireless power transmitting device 2000b via short-range communication so that the controller of the wireless power transmitting device 2000b may control the transmitter switch 2040. Furthermore, the controller 1080 may receive control information of the transmitter switch 2040 from the controller of the wireless power transmitting device 2000b to control the switch 1040 and the receiver switch 1090 based on the control information of the transmitter switch 2040.

Figure 6:
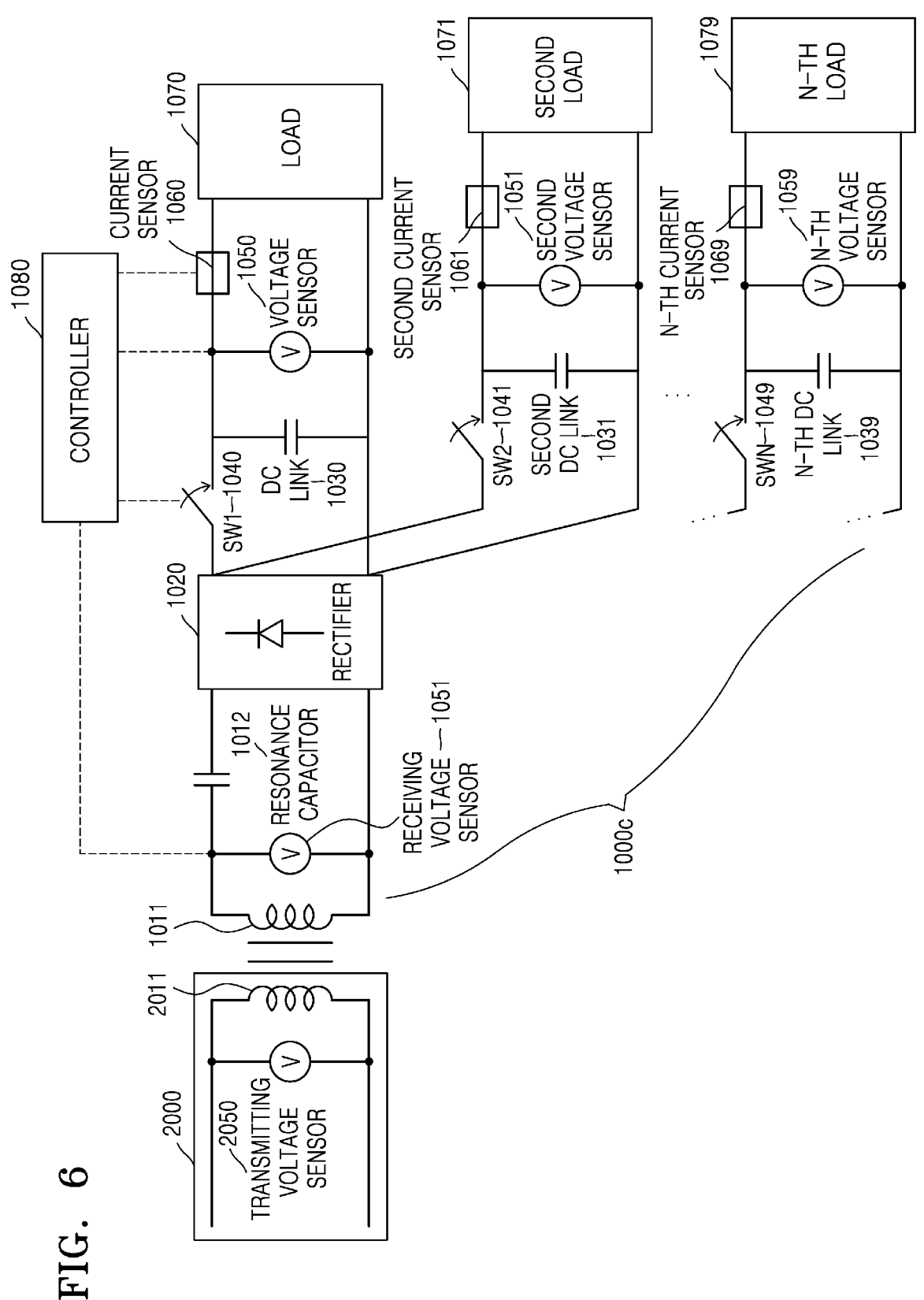
FIG. 6 illustrates a wireless power-driven household device for driving a plurality of loads, according to an embodiment of the disclosure.

FIG. 6 illustrates a wireless power-driven household device 5000 for driving a plurality of loads, according to an embodiment of the disclosure.

Although all components of a wireless power transmitting device 2000 and a household appliance 1000c of FIG. 6 are substantially the same as their counterparts in FIG. 4, unlike the household appliance 1000b, the household appliance 1000c may include a plurality of DC links and a plurality of loads connected in parallel to a rectifier 1020.

According to an embodiment of the disclosure, a second DC link 1031 is connected in parallel to an output of the rectifier 1020.

According to an embodiment of the disclosure, the plurality of DC links including an N-th DC link 139 may be connected in parallel to the output of the rectifier 1020.

A second switch 1041 is provided between the second DC link 1031 and the rectifier 1020 to adjust the amount of power supplied to a second load 1071. The controller 1080 obtains information about current flowing in the second load 1071 via a second current sensor 1061, and obtains voltage information of the second DC link 1031 via the second voltage sensor 1051. The controller 1080 performs calculation on the obtained two pieces of information to determine the amount of power supplied to the second load 1071, and controls on/off of the second switch 1041 in response to the determined amount of power.

In this case, the controller 1080 may independently control the amounts of power respectively supplied to the load 1070 and the second load 1071 by independently controlling the switch 1040 and the second switch 1041.

In the same manner, the plurality of DC links, i.e., the DC link 1030 and the second through N-th DC links 1031 through 1039, and the plurality of loads, i.e., the load 1070 and second through N-th loads 1071 through 1079, are independently controlled via the switch 1040 and the second through N-th switches 1041 through 1049 respectively arranged in front of the DC link 1030 and the second through N-th DC links 1031 through 1039. For example, when the N-th DC link 1039 is connected in parallel to the second DC link 1031, the controller 1080 independently controls on/off of the N-th switch 1049 to control the N-th load 1079.

Referring to FIG. 6, the amounts of power respectively supplied to the plurality of loads, i.e., the load 1070 and the second through N-th loads 1071 through 1079, may be independently controlled by the switch 1040 and the second through N-th switches 1041 through 1049.

A case where there is the receiver switch 1090 as in FIG. 4 without the switch 1040 and the second through N-th switches 1041 through 1049, and where an increase or decrease in the amount of power to be supplied to each load varies is now considered. In other words, when the load 1070 requires a greater amount of power than the current amount of power, and the second load 1071 requires a smaller amount of power than that, it is difficult to cope with variations in the amount of power required by each load by simply opening and closing (on/off) the receiver switch 1090.

Thus, the controller 1080 is required to independently control each of the switch 1040 and the second through N-th switches 1041 through 1049 for each of corresponding loads, placed between the rectifier 1020 and the DC link 1030 and the second through N-th DC links 1031 through 1039.

Figure 7:
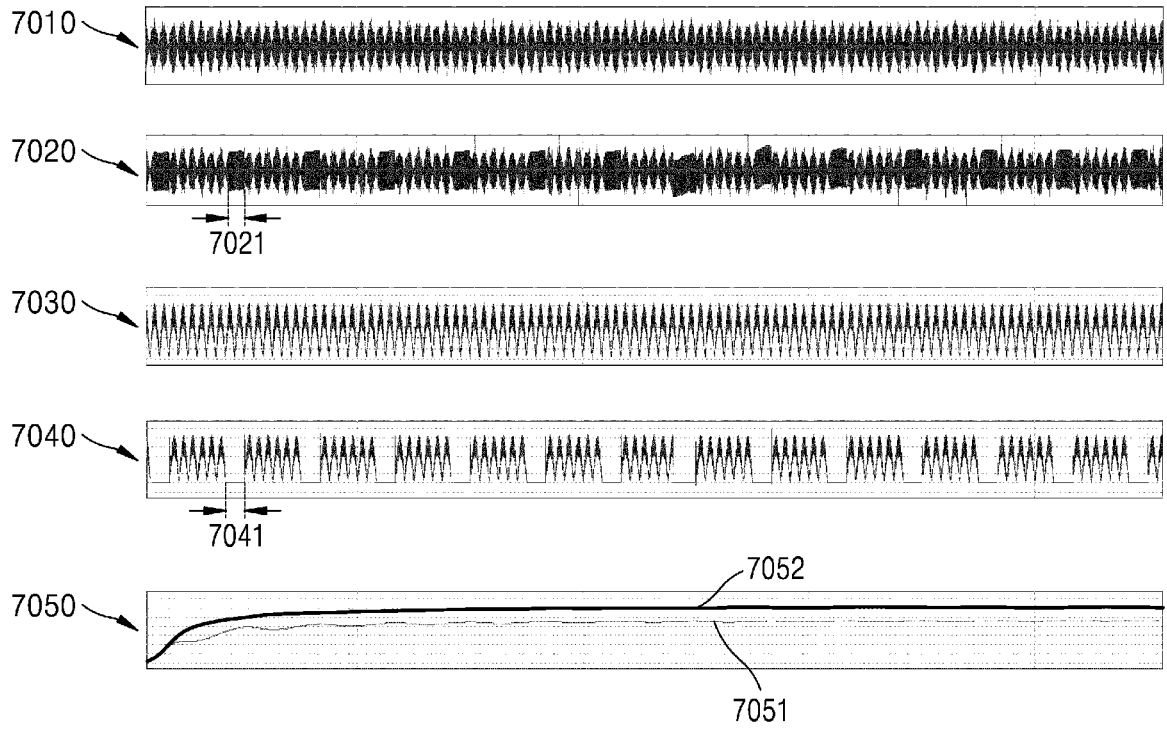
FIG. 7 illustrates graphs of power and voltage waveforms corresponding to components of a wireless power-driven household device, according to an embodiment of the disclosure.

FIG. 7 illustrates graphs of power and voltage waveforms corresponding to components of a wireless power-driven household device, according to an embodiment of the disclosure.

The graphs of FIG. 7 are described with respect to the household appliance 1000 of FIG. 2.

Referring to FIG. 7, a first graph shows an input voltage waveform received by the household appliance 1000.

The input voltage waveform 7010 may be sensed by the receiving voltage sensor 1050-1 of FIG. 2. An input voltage received by the receiving coil 1011 is an AC voltage as can be seen in the input voltage waveform 7010. The input voltage is an AC voltage, but may have amplitudes that vary with time due to resonance. Accordingly, in FIG. 4, the receiver switch 1090 may be opened or closed in synchronization with a zero crossing point that is a point where the AC voltage is equivalent to a smallest amplitude. In another embodiment of the disclosure, the receiver switch 1090 may be opened and closed in synchronization with a preset level of an amplitude of the AC voltage.

A second graph shows a power amount control input voltage waveform 7020 generated based on the input voltage waveform 7010 which includes an interval 7021 during which the switch 1040 is turned off to control the amount of power to be supplied to the load 1070.

A third graph illustrates a DC-link voltage waveform 7030 when there is no switching by the switch 1040. The DC-link voltage waveform 7030 may be sensed by the voltage sensor 1050. As seen in FIG. 7, the DC-link voltage waveform 7030 is a waveform obtained by the rectifier 1020 rectifying the input voltage waveform 7010 into a DC voltage waveform.

A fourth graph illustrates a power amount control DC-link voltage waveform 7040 when the switch 1040 operates to control the amount of power to be supplied to the load 1070. As seen in the power amount control DC-link voltage waveform 7040, a DC-link voltage value becomes 0 during an interval 7041 when the switch 1040 operates in an off state, compared to when in the DC-link waveform 7030.

A fifth graph is graph 7050 of an average amount of power consumed by the load 1070. In the graph 7050 of the average amount of power consumed by the load 1070, a general average power waveform 7052 is a waveform when a maximum amount of power is supplied to the load 1070 without switch control, and a power amount control average power waveform 7051 is a waveform when the switch 1040 operates to control the amount of power. When the amount of power is controlled as in the power amount control DC-link voltage waveform 7040, as seen in the power amount control average power waveform 7051, a total amount of power is less than the amount of power shown in the general average power 7052 waveform.

FIG. 8 illustrates a circuit diagram of the wireless power transmitting device 2000 according to an embodiment of the disclosure.

According to an embodiment of the disclosure, the wireless power transmitting device 2000 may be classified into a half-bridge type wireless power transmitting device 8000-1 and a single-ended type wireless power transmitting device 8000-2, but is limited thereto.

Referring to FIG. 8, the half-bridge type wireless power transmitting device 8000-1 drives two semiconductor switches 2021 and 2023 so that a resonance capacitor $C_{eq}$ 2013a resonates with a transmitting coil $L_{eq}$ 2011. The transmitter switch 2040 as in FIG. 5 above may be connected in series to the transmitter coil $L_{eq}$ 2011a and the resonance capacitor $C_{eq}$ 2013a. For the semiconductor switches 2021 and 2023, insulated gate bipolar transistors (IGBTs) are mainly used. But metal-oxide-semiconductor field-effect transistors (MOSFETs) or other types of transistors may be also used according to required specifications.

Referring to FIG. 8, the single-ended type wireless power transmitting device 8000-2 drives one semiconductor switch 2025 to achieve resonance between a transmitting coil $L_{eq}$ 2011b and a resonance capacitor $C_{eq}$. For the semiconductor switch 2025, an IGBT is mainly used, and a MOSFET or another type of transistor may be used according to required specifications.

FIG. 9 illustrates a method of controlling the amount of power supplied to a load in a wireless power-driven household device, according to an embodiment of the disclosure.

In operation S9001, the household appliance 1000 wirelessly receives AC power from the transmitting coil 2011 of the wireless power transmitter 2010 via the receiving coil 1011. As described with reference to FIG. 1B, the transmitting coil 2011 and the receiving coil 1011 share a magnetic field flux, and the receiving coil 1011 receives AC power from the transmitting coil 2011 due to electromagnetic induction.

In operation S9003, an AC voltage from the AC power wirelessly received via the receiving coil 1011 is rectified by the rectifier 1020, and a DC voltage that is an output of the rectifier 1020 is transmitted to the DC link 1030.

In operation S9005, a current supplied from the DC link 1030 to the load 1070 is sensed by the current sensor 1060, and the controller 1080 obtains information about the sensed current.

In operation S9007, the controller 1080 adjusts the amount of power to be supplied to the load 1070 by controlling the on/off of the switch 1040 arranged between the rectifier 1020 and the DC link 1030. In this case, the controller 1080 may control the on/off of the second switch 1041 arranged between the rectifier 1020 and the second DC link 1031 connected in parallel to the output of the rectifier 1020 and the rectifier 1020 to thereby control the amount of power to supplied to the second load 1071 connected to the second DC link 1031.

In addition, the controller 1080 may control on/off of the transmitter switch 2040 in the wireless power transmitter 2010 independently of the switch 1040 or in conjunction with controlling the on/off of the switch 1040 in order to control the amount of power supplied to the load 1070.

Figure 10:
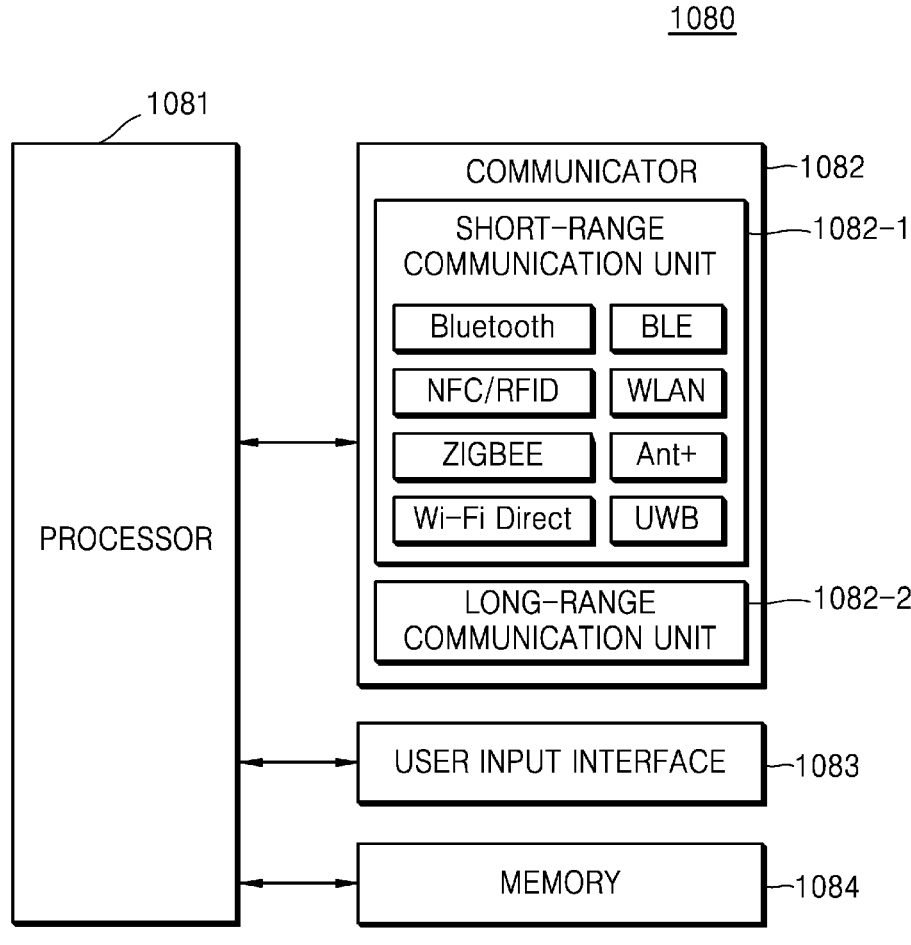
FIG. 10 illustrates block diagram of a controller of a wireless power-driven household device, according to an embodiment of the disclosure.

FIG. 10 illustrates a block diagram of a controller 1080 of a wireless power-driven household device, according to an embodiment of the disclosure.

Referring to FIG. 10, the controller 1080 included in the wireless power-driven household device 5000 or household appliance 1000, 1000b or 1000c according to an embodiment of the disclosure may include a processor 1081, a communicator 1082, a user input interface 1083, and a memory 1084. All components shown in FIG. 20 are not essential components of the electronic device 1000. The wireless power-driven household device 5000 or household appliance 1000, 1000b or 1000c may be implemented with more or fewer components than those shown in FIG. 10. Although not shown in FIG. 10, the controller 1080 may further include an output interface, a display, etc.

Configurations and operations of the components are now described.

The processor 1080 generally controls all operations of the wireless power-driven household device 5000 or household appliance 1000, 1000b or 1000c according to an embodiment of the disclosure. For example, the processor 1081 may control all operations of the communicator 1082, the user input interface 1083, the memory 1084, etc. by executing programs stored in the memory 1084.

According to an embodiment of the disclosure, the processor 1081 may include an AI processor for creating a learning network model, but is not limited thereto. According to an embodiment of the disclosure, the AI processor may be implemented as a chip separate from the processor 1710. According to an embodiment of the disclosure, the AI processor may be a general-purpose chip.

A short-range communication device 1082-1 may include, but is not limited to, a Bluetooth communication device, a Bluetooth Low Energy (BLE) communication device, a Near Field Communication (NFC) device, a wireless local area network (WLAN) (or Wi-Fi) communication device, a Zigbee communication device, an Infrared Data Association (IrDA) communication device, a Wi-Fi Direct (WFD) communication device, an ultra-wideband (UWB) communication device, an Ant+ communication device, etc.

When the household appliance 1000, 1000b, or 1000c is placed (stationed) on the wireless power transmitting device 2000 or 2000b, the short-range communication unit 1082-1 may notify the wireless power transmitting device 2000 or 2000b about the presence of the household appliance 1000, 1000b, or 1000c by transmitting a signal to the wireless power transmitting device 2000 or 2000b. The wireless power transmitting device 2000 and 2000b are used to control blocking or reduction of wireless power output based on information indicating detection of the household appliance 1000, 1000b, or 1000c. In this case, the wireless power-driven household device 5000 may use a communication method using NFC by adding an NFC antenna coil to the transmitting coil 2011 and the receiving coil 1011 for short-range communication. When short-range communication such as NFC is used, the wireless power transmitting device 2000 or 2000b may detect that the household appliance 1000, 1000b, or 1000c is placed on the wireless transmitting device 2000 or 2000b by recognizing an NFC tag attached to the household appliance 1000, 1000b, or 1000c. According to an embodiment of the disclosure, the household appliances 1000, 1000b, or 1000c and the wireless power transmitting device 2000 or 2000b may correspond to the wireless power-driven household device 5000 that is a type of household appliance. When the household appliance 1000, 1000b, or 1000c is placed on the wireless power transmitting device 2000 or 2000b, the wireless power transmitting device 2000 or 2000b may also obtain identification information of the household appliance 1000, 1000b, or 1000c.

The household appliance 1000, 1000b, or 1000c transmit, via the short-range communication device 1082-1, information about the amount of power required by the load 1070 to the wireless power transmitting device 2000 or 2000b. The wireless power transmitting device 2000 or 2000*b* controls on/off of the transmitter switch 2040 according to the amount of power required by the load 1070.

According to an embodiment of the disclosure, the long-range communication device 1082-2 is not an essential component of the controller 1080, but is used to communicate with an external device when the household appliance 1000, 1000*b*, or 1000*c* is remotely controlled by the external device (e.g., a mobile device or computing device) in an Internet of Things (IOT) environment.

The user input interface 1083 refers to a means via which a user inputs data for controlling the household appliance 1000, 1000*b*, or 1000*c*. Examples of the user input interface 1083 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, a jog switch, a dial switch, etc.

According to an embodiment of the disclosure, the user input interface 1083 may include a button region including a power button, a heating control button, etc.

The user input interface 1083 may further include a microphone (not shown) for receiving a user's voice input. The microphone receives an external sound signal and process the external sound signal into electrical audio data. For example, the microphone may receive a sound signal (e.g., a voice command) from an external device or a speaker. The microphone may use various noise removal algorithms to remove noise that occurs in the process of receiving an external sound signal.

The memory 1084 may store programs for processing or control performed by the processor 1081 or store input/output data (e.g., fine dust level, temperature and humidity data, gas level, notification setting, filter replacement cycle information, etc.).

The memory 1084 may include at least one type of storage medium, i.e., any among a flash memory-type memory, a hard disk-type memory, a multimedia card micro-type memory, a card-type memory (e.g., an Secure Digital (SD) card or an Extreme Digital (XD) memory), random access memory (RAM), static RAM (SRAM), read-only memory (ROM), electrically erasable programmable ROM (EE-PROM), PROM, a magnetic memory, a magnetic disc, or an optical disc. Programs stored in the memory 1084 may be categorized into a plurality of modules according to their functions. At least one AI model may be stored in the memory 1084.

The wireless power-driven household device 5000 according to an embodiment of the disclosure may be applied not only to the field of household appliances but also to various other fields. The method and wireless power-driven household device 5000 according to embodiments of the disclosure may be applied to devices including a receiver having a mobility function, such as a car, a wirelessly operated robot, a drone, etc. In utilizing these devices that provide mobility, such as automobiles, robots, drones, and other forms of transportation, the rectified power obtained at the wireless power receiver 1010 may be used for charging or driving these devices. When the wireless power-driven household device 5000 according to the disclosure is used for device charging, a particular power converter such as a DC-to-DC converter may be used.

Functions related to AI according to the disclosure are performed via a processor and a memory. The processor may be configured as one or a plurality of processors. In this case, the one or plurality of processors may be a general-purpose processor such as a central processing unit (CPU), an application processor (AP), or a digital signal processor (DSP), a graphics processor such as a graphics processing unit (GPU) or a vision processing unit (VPU), or an AI processor such as a neural processing unit (NPU). For example, the one or plurality of processors may control input data to be processed according to predefined operation rules or an AI model stored in the memory. Alternatively, when the one or plurality of processors are an AI processor, the AI processor may be designed with a hardware structure specialized for processing a particular AI model.

The predefined operation rules or AI model may be created via a training process. In this case, the creation via the training process means that the predefined operation rules or AI model set to perform desired characteristics (or purpose) are created by training a basic AI model based on a large number of training data via a learning algorithm. The training process may be performed by a device itself in which AI is performed or via a separate server and/or system. Examples of a learning algorithm may include, but are not limited to, supervised learning, unsupervised learning, semi-supervised learning, and reinforcement learning.

An AI model may include of a plurality of neural network layers. Each of the plurality of neural network layers has a plurality of weight values and may perform neural network computations via calculations between a result of computations in a previous layer and the plurality of weight values. A plurality of weight values assigned to each of the plurality of neural network layers may be optimized by a result of training the AI model. For example, the plurality of weight values may be refined to reduce or minimize a loss or cost value obtained in the AI model during a training process. An artificial neural network may include a deep neural network (DNN), and may be, for example, a convolutional neural network (CNN), a DNN, a recurrent neural network (RNN), a restricted Boltzmann machine (RBM), a deep belief network (DBN), a bidirectional recurrent DNN (BRDNN), or a deep Q-network (DQN) but is not limited thereto.

Methods according to embodiments of the disclosure may be implemented in the form of program instructions executable by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by those skilled in the art of computer software. Examples of the computer-readable recording media include magnetic media such as hard disks, floppy disks, and magnetic tape, optical media such as compact disk-ROM (CD-ROM) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also high-level language code executable by a computer using an interpreter or the like.

Some embodiments of the disclosure may also be implemented in the form of recording media including instructions executable by a computer, such as a program module executed by the computer. The computer-readable recording media may be any available media that are accessible by a computer and include both volatile and nonvolatile media and both removable and non-removable media. Furthermore, the computer-readable recording media may include both computer storage media and communication media. The computer storage media include both volatile and nonvolatile, removable and non-removable media implemented using any method or technology for storage of information such as computer-readable instructions, data structures, program modules or other data. The communication media typically embody computer-readable instructions, data structures, program modules, other data in a modulated data signal such as other transmission mechanism, and includes any information transmission media. Some embodiments of the disclosure may also be implemented as a computer program product or computer program including instructions executable by a computer.

A computer-readable storage medium may be provided in the form of a non-transitory storage medium. In this regard, the term 'non-transitory storage medium' only means that the storage medium does not include a signal (e.g., electromagnetic wave) and is a tangible device, and the term does not differentiate between where data is semi-permanently stored in the storage medium and where the data is temporarily stored in the storage medium. For example, the 'non-transitory storage medium' may include a buffer for temporarily storing data.

Furthermore, the methods according to the embodiments of the disclosure may be included in a computer program product when provided. The computer program product may be traded, as a product, between a seller and a buyer. The computer program product may be distributed in the form of a computer-readable storage medium (e.g., CD-ROM) or distributed (e.g., downloaded or uploaded) on-line via an application store or directly between two user devices (e.g., smartphones). For online distribution, at least a part of the computer program product may be at least transiently stored or temporally generated in the computer-readable storage medium such as a memory of a server of a manufacturer, a server of an application store, or a relay server.

According to an embodiment of the disclosure, a wireless power-driven household device may control the amount of power to be supplied to a load via a switch capable of soft switching.

In addition, according to an embodiment of the disclosure, the wireless power-driven household device may independently control a plurality of loads even when the plurality of loads are connected in parallel to the rectifier by arranging a switch between a rectifier and a DC link.

While embodiments of the disclosure have been particularly described above with reference to the figures, it will be understood that the scope of the disclosure is not limited to the embodiments of the disclosure and various modifications and improvements made by those of ordinary skill in the art based on a basic concept of the disclosure also fall within the scope as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A wireless power receiving device comprising:
a receiving coil configured to wirelessly receive power from a wireless power transmitting device;
a rectifier configured to rectify an alternating current (AC) voltage received wirelessly into a direct current (DC) voltage and output the DC voltage;
a first DC link configured to receive the DC voltage output from the rectifier;
a current sensor configured to sense current supplied from the first DC link to a first load;

a first switch provided between the rectifier and the first DC link; and
a controller configured to:
receive a user input indicative of a power level;
determine a target amount of power to be supplied to the first load based on the user input; and
adjust an amount of power supplied to the first load to match the target amount of power by controlling an on/off state of the first switch based on the current supplied to the first load and sensed by the current sensor.

2. The wireless power receiving device of claim 1, further comprising:
a resonance capacitor configured to resonate with the receiving coil; and
a receiver switch provided between the receiving coil and the resonance capacitor.

3. The wireless power receiving device of claim 2, wherein the controller is further configured to control the receiver switch independent of the first switch to adjust the amount of power to be supplied to the first load.

4. The wireless power receiving device of claim 2, further comprising a voltage sensor configured to detect a zero-crossing point or a preset voltage level of the AC voltage received as input to the rectifier.

5. The wireless power receiving device of claim 4, wherein the controller is further configured to control the on/off state of the first switch to be synchronized with the zero-crossing point or the preset voltage level of the AC voltage, which is detected by the voltage sensor.

6. The wireless power receiving device of claim 2, wherein the controller is further configured to control an on/off duty cycle of the first switch to be equal to a multiple of a cycle during which an amplitude of the AC voltage is equivalent to a minimum value.

7. The wireless power receiving device of claim 1, further comprising:
a second DC link connected in parallel to an output of the rectifier; and
a second switch provided between the second DC link and the rectifier to adjust an amount of power to be supplied to a second load connected to the second DC link.

8. The wireless power receiving device of claim 7, wherein the controller is further configured to control the amount of power to be supplied to the first load via the first switch independent of the amount of power to be supplied to the second load via the second switch.

9. The wireless power receiving device of claim 2, further comprising a first DC-link voltage sensor configured to sense a voltage across the first DC link,
wherein the controller is further configured to determine the amount of power required by the first load by performing calculation on the current supplied to the first load and sensed by the current sensor and the voltage across the first DC link sensed by the first DC-link voltage sensor.

10. The wireless power receiving device of claim 9, wherein the controller is further configured to control the first switch based on the amount of power required by the first load.

11. A wireless power-driven household device comprising:
a wireless power transmitter configured to wirelessly transmit power via a transmitting coil;

a receiving coil configured to wirelessly receive power from the transmitting coil of the wireless power transmitter;

a rectifier configured to rectify an alternating current (AC) voltage received wirelessly into a direct current (DC) voltage and output the DC voltage;

a first DC link configured to receive the DC voltage output from the rectifier;

a current sensor configured to sense current supplied from the first DC link to a first load;

a first switch provided between the rectifier and the first DC link; and a controller configured to:

receive a user input indicative of a power level, determine a target amount of power to be supplied to the first load based on the user input, and adjust an amount of power supplied to the first load to match the target amount of power by controlling an on/off state of the first switch based on the current supplied to the first load and sensed by the current sensor.

12. The wireless power-driven household device of claim 11, further comprising:

a resonance capacitor configured to resonate with the receiving coil; and a receiver switch provided between the receiving coil and the resonance capacitor.

13. The wireless power-driven household device of claim 12, wherein the controller is further configured to control the receiver switch independent of the first switch to adjust the amount of power to be supplied to the first load.

14. The wireless power-driven household device of claim 12, further comprising a voltage sensor configured to detect a zero-crossing point or a preset voltage level of the AC voltage received as input to the rectifier.

15. The wireless power-driven household device of claim 14, wherein the controller is further configured to:

control the on/off state of the first switch to be synchronized with the zero-crossing point or the preset voltage level of the AC voltage, which is detected by the voltage sensor; and control an on/off duty cycle of the first switch to be equal to a multiple of a cycle during which an amplitude of the AC voltage is equivalent to a minimum value.

16. The wireless power-driven household device of claim 12, further comprising a first DC-link voltage sensor configured to sense a voltage across the first DC link, wherein the controller is further configured to determine the amount of power required by the first load by performing calculation on the current supplied to the first load and sensed by the current sensor and the voltage across the first DC link sensed by the first DC-link voltage sensor.

17. The wireless power-driven household device of claim 16, wherein the controller is further configured to control the first switch based on the amount of power required by the first load.

18. The wireless power-driven household device of claim 16, wherein the wireless power transmitter further comprises a transmitter switch, and wherein the controller is further configured to control the first switch and the transmitter switch based on the amount of power required by the first load.

19. The wireless power-driven household device of claim 18, further comprising a transmitting voltage sensor, wherein the controller is further configured to control an on/off state of the transmitter switch to be synchronized with a zero-crossing point of an AC voltage of the wireless power transmitter sensed by the transmitting voltage sensor.

20. The wireless power-driven household device of claim 18, wherein the transmitter switch is placed between the transmitting coil and a resonance capacitor resonating with the transmitting coil.

* * * * *